Patented Mar. 29, 1932

1,851,040

UNITED STATES PATENT OFFICE

HANS FIKENTSCHER AND BERNHARD JACOBI, OF LUDWIGSHAFEN-ON-THE-RHINE, GERMANY, ASSIGNORS TO I. G. FARBENINDUSTRIE AKTIENGESELLSCHAFT, OF FRANKFORT-ON-THE-MAIN, GERMANY

PRODUCTION OF CHLOROPROPIONIC ESTERS

No Drawing. Application filed May 2, 1931, Serial No. 534,694, and in Germany May 7, 1930.

The present invention relates to the production of chloropropionic esters.

The methods of preparing $\beta$-chloropropionic acid already known are alike expensive and inconvenient. Thus for example the direct chlorination of propionic acid leads to a mixture of chlorinated propionic acids which is difficult to separate. The high price of $\beta$-iodopropionic acid prohibits the industrial production of $\beta$-chloropropionic acid therefrom. In order to convert hydracrylic nitrile into chloropropionic nitrile, expensive inorganic acid chlorides are necessary. The preparation of $\beta$-chloropropionic acid from hydracrylic nitrile by way of the sodium salt of hydracrylic acid and acrylic acid necessitates several inconvenient processes.

We have now found that the esters of $\beta$-chloropropionic acid are obtained directly in a simple and inexpensive manner by way of $\beta$-chloropropionic acid by adding hydrogen chloride on to the readily accessible acrylic nitrile and saponifying and esterifying the resulting $\beta$-chloropropionic nitrile by means of hydrochloric acid and the alcohol desired. The addition of hydrogen chloride on acrylic nitrile can be carried out by introducing gaseous hydrogen chloride into the nitrile or by mixing the nitrile with concentrated, from say 30 to 35 per cent, aqueous hydrochloric acid and saturating with gaseous hydrogen chloride, whereby a simultaneous addition of hydrogen chloride and a saponification of the nitrile occurs. The esters separate from the aqueous hydrochloric acid in most cases and can therefore readily be isolated. Any mono- or poly-hydric alcohols, which term is meant to include derivatives of polyhydric alcohols containing free hydroxyl groups, as for example ethylene chlorhydrin, ethylene glycol mono-methyl ether and the like, may be employed for the esterification. The alcohol may be added to the reaction mixture before adding on the hydrogen chloride or before or after the saponification of the nitrile.

Thus esters of $\beta$-chloropropionic acid are obtained in good yields in one operation without isolating the acid itself.

The following examples will further illustrate the nature of this invention, but the invention is not restricted to these examples. The parts are by weight.

Example 1

100 parts of acrylic nitrile are treated at room temperature with gaseous hydrogen chloride in a vessel provided with a reflux condenser until the specific gravity of the solution has risen from 0.78 to 1.144. 150 parts of concentrated hydrochloric acid are allowed to flow into the resulting crude $\beta$-chloropropionic nitrile, cooling being employed at the commencement on working on a large scale. After about 10 minutes the ammonium chloride formed by the saponification commences to separate out. The whole is then heated to 100° C. for 1 hour while continually leading in gaseous hydrogen chloride and then 62 parts of methanol are added. After another 10 minutes the reaction mixture is cooled and filtered. The filtrate separates into two layers the upper layer consisting of $\beta$-chloropropionic methyl ester. The ammonium chloride filtered off is dissolved in water in order to recover the ester adhering to the ammonium chloride. After drying with the aid of anhydrous sodium sulphate or of calcium chloride the crude $\beta$-chloropropionic acid ester is practically pure. The yield amounts to 220 parts, i. e. 96 per cent of the theoretical yield.

The concentrated aqueous hydrochloric acid separated off contains the small amounts of $\beta$-chloropropionic acid and alcohol which have escaped the reaction. By employing this hydrochloric acid again, the total yield by carrying out the process becomes practically quantitative.

Example 2

100 parts of acrylic nitrile are converted into $\beta$-chloropropionic nitrile according to Example 1, 150 parts of concentrated hydrochloric acid and 90 parts of ethanol are added and the whole is boiled under a reflux condenser for 2 hours while leading in gaseous hydrogen chloride. The whole is worked up as described in Example 1. The yield of $\beta$- chloropropionic ethyl ester amounts to about 244 parts, i. e. 95 per cent of the theoretical yield.

Example 3

100 parts of acrylic nitrile are placed in a vessel capable of being closed and provided with a stirrer. The vessel is closed and the air is then displaced from the vessel by means of gaseous hydrogen chloride, and the leading in of hydrogen chloride being continued at any suitable pressure and at room temperature until the increase in weight amounts to 69 parts. 150 parts of a 30 per cent aqueous hydrochloric acid and 202 parts of benzyl alcohol are then allowed to flow in. As soon as the spontaneous evolution of heat which at first takes place has subsided, the whole is heated to boiling for about 2 hours while continually leading in gaseous hydrogen chloride, it is then allowed to cool and worked up as described in Examples 1 and 2. The yield amounts to 366 parts, i. e. 98 per cent of the theoretical yield.

Example 4

100 parts of acrylic nitrile are converted into β-chloropropionic nitrile as described in Example 1 and the nitrile is then saponified. 120 parts of ethylene glycol are then added and the reaction mixture is refluxed for 1 hour while continuously introducing gaseous hydrochloric acid. Since no layers are formed the ester is separated by distillation in vacuo. The yield of ethylene glycol monochloropropionic ester is from 200 to 220 parts corresponding to a yield of from 70 to 75 per cent of the theoretical yield.

Example 5

100 parts of acrylic nitrile are converted into β-chloropropionic nitrile as described in Example 1, whereupon the nitrile is refluxed for 2 hours together with 150 parts of concentrated hydrochloric acid and 160 parts of ethylene chlorhydrin. The reaction mixture is then worked up as described in Example 1, 300 parts of the β-chloropropionic chlorethyl ester being obtained corresponding to from 92 to 94 per cent of the theoretical yield.

Example 6

100 parts of acrylic nitrile are converted into β-chloropropionic nitrile as described in Example 1, and the nitrile is then saponified with the aid of 150 parts of concentrated hydrochloric acid. 155 parts of ethylene glycol mono-methyl ether are then added, whereupon the mixture is refluxed for 1 hour while saturating it with gaseous hydrochloric acid. The reaction obtained corresponds to a yield of from 95 to 97 per cent of the theoretical yield.

What we claim is:—

1. The process for the production of chloropropionic esters which comprises adding hydrochloric acid on acrylic nitrile, directly saponifying the resulting chloropropionic nitrile and esterifying the resulting chloropropionic acid in the presence of hydrochloric acid.

2. The process for the production of chloropropionic esters which comprises adding hydrochloric acid on acrylic nitrile in the presence of an alcohol, directly saponifying the resulting chloropropionic nitrile and esterifying the resulting chloropropionic acid with the alcohol present by means of anhydrous hydrochloric acid.

3. The process for the production of chloropropionic esters which comprises adding hydrochloric acid on acrylic nitrile, acting on the resulting reaction mixture with hydrochloric acid in the presence of water, adding an alcohol and acting on the mixture with anhydrous hydrochloric acid.

4. The process for the production of chloropropionic esters which comprises adding hydrochloric acid on acrylic nitrile, acting on the resulting reaction mixture with hydrochloric acid in the presence of water, adding an alcohol and acting on the reaction mixture at about its boiling point with anhydrous hydrochloric acid.

In testimony whereof we have hereunto set our hands.

HANS FIKENTSCHER.
BERNHARD JACOBI.